United States Patent Office 2,860,144
Patented Nov. 11, 1958

2,860,144

PREPARATION OF PEROXY-SULFONATES

Herbert Wirth, Dusseldorf-Holthausen, Germany, assignor to Henkel & Cie, G. m. b. H., Dusseldorf-Holthausen, Germany, a German corporation No Drawing. Application December 19, 1955
Serial No. 553,707

Claims priority, application Germany December 23, 1954

8 Claims. (Cl. 260—345.1)

This invention relates to and has as its object the production of novel peroxy-sulfonates, constituting valuable chemical compounds, which, in accordance with their peroxide nature, may be used wherever water-soluble materials are required for radical formation. The new compounds may therefore be used as starting material for chain reactions as catalysts for polymerization reactions, and, furthermore, as valuable intermediates for organic synthesis.

The novel peroxy-sulfonates in accordance with the invention have the general formula R—O—O—R'—SO$_3$—Cat in which R is a hydrocarbon radical containing 1-30 carbon atoms, a cation, or the group Cat'—SO$_3$—R"—

(Cat' representing a cation and R" a hydrocarbon radical containing 1-30 carbon atoms), R' is a hydrocarbon radical containing 3-10 carbon atoms in the form of an alkylene (divalent alkyl) chain bound to the peroxide and SO$_3$ groups, and Cat is a cation.

The novel peroxy-sulfonates may be divided into three basic groups. The first group has the formula

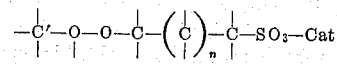

in which C' is a primary, secondary, or tertiary carbon atom, which is part of an organic radical having 1-30 carbon atoms, $n$ is a whole number from 1 to 8, and Cat is a cation. The free carbon valences as shown in the general formula are bound with hydrogen atoms, organic radicals, and particularly hydrocarbon radicals and/or form olefinic or aromatic double bonds with one another.

The second group of peroxy-sulfonates has the general formula

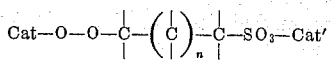

in which Cat and Cat' are the same or different cations, and the remainder of the formula is as described above.

The third group of the peroxy-sulfonates in accordance with the invention have the general formula

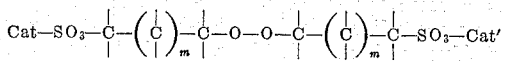

in which $m$ is a whole number between 1 and 8, and the remainder of the formula is as described above.

In connection with all of the above formulas, the portions of the radicals between the SO$_3$ and peroxy groups should not contain more than 20, and preferably between 3 and 7 carbon atoms.

In accordance with the invention, the novel peroxy-sulfonates are formed by reacting a hydroperoxide in the form of its salt or in the presence of an acid-binding material with a sultone. The first class of compounds produced in accordance with the invention is formed with the use of an organic hydroperoxide, whereas hydrogen peroxide itself may be used in the formation of the second and third classes.

The hydroperoxide salts contain a metal cation and preferably a monovalent or bivalent metal cation, such as a sodium, potassium, barium, magnesium, calcium, and strontium cation. When the peroxide itself is used for the reaction in the presence of an acid-binding material, such as an alkali earth or alkali compound such as carbonates, hydroxides, or oxides, of sodium, potassium, magnesium, calcium, strontium or barium, a peroxide salt is believed to form in situ.

Sultones are inner, i. e., cyclic, esters of hydroxy-sulfonic acids having the characteristic group

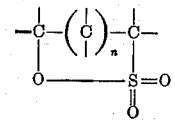

in which $n$ is a whole number equal to at least 1. The free valences present on the C-atoms, as shown in the formula, are connected with hydrogen atoms, organic radicals, particularly hydrocarbon radicals, or with one another to form olefinic or aromatic double bonds. Accordingly, the carbon chain indicated in the formula may represent the radical of propane or part of another organic compound having a straight or branched carbon chain or with aromatic or non-aromatic ring systems. Sultones are known in which the value of $n$ is up to 8; sultones having a value of $n=1-3$ are of particular practical importance. The total number of carbon atoms present in the sultone is in most cases not more than 20. In general, sultones having a total of 3-7 carbon atoms are used. Such sultones are, for example, propane sultone and the various isomeric sultones, which are derived from butanes, pentanes, hexanes or heptanes or their technical mixtures, and, furthermore, decanesultone-1,10, toluylsultone, 1,8-naphthosultone or sultones of cycloaliphatic compounds.

The hydroperoxides to be used have the general formula:

R—O—O—H in which R is a hydrogen atom or an organic radical which is bound with a non-aromatic carbon atom to the peroxide radical. The organic peroxides have the general formula:

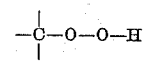

in which C is a primary, secondary, or tertiary carbon atom and the free valences present on the carbon atom shown are connected in any desired manner with hydrogen atoms or organic radicals particularly hydrocarbon radicals, which may contain additional peroxide groups.

The simplest hydroperoxide used is accordingly hydrogen peroxide itself. Organic peroxides may contain 1-30 carbon atoms in the molecule and be derived from saturated or unsaturated, straight chain, or branched chain, aromatic or non-aromatic cyclic compounds. Among the group of hydroperoxides with cyclic organic radicals there belong in particular those having 4- to 8-membered rings which can be condensed with each other and in which heteroatoms, particularly oxygen or sulfur atoms, may be present. Furthermore, the organic hydroperoxides which are used may be substituted by various heteroatoms or heteroatom groups such as hydroxyl groups, sulfhydryl groups, ether groups, thioether groups, carboxylic acid or carboxylate groups and halogen atoms.

As starting materials for the method of the invention there may be used, for example, the following hydroperoxides: ethylhydroperoxide, sec. amylhydroperoxide, tert. butylhydroperoxide, xylylhydroperoxide, p-cymolhydroperoxide, cumenehydroperoxide, hydroperoxides of diisopropylbenzols, isopropylnaphthalenehydroperoxide, ethyletherhydroperoxide, methyloleate hydroperoxide, 2-hydroperoxy-2-ethoxyphenyl-butane, 2 - hydroperoxy-2-toluyldodecane, 2 - hydroperoxy - 2 - methyl - dodecane, 1 - hydroperoxy - 1 - phenyl - 1 - chlorophenyl - ethane, diphenylmethanehydroperoxide, triphenylmethanehydroperoxide, tritoluylmethanehydroperoxide, as well as 1-hydroperoxy-1-hydroperoxy-hexane or 1-hydroxy-isovaleryl-hydroperoxide-1.

Hydroperoxides, the hydroperoxide groups of which are located on non-aromatic rings systems are, for example, cyclohexylhydroperoxide, cyclohexenylhydroperoxide, 1 - methyl - cyclohexenylhydroperoxide, phenylcyclohexylhydroperoxide, 1 - hydroxycyclohexenylhydroperoxide, 1 - hydroxy - 1 - hydroperoxide - cyclohexene, 1 - hydroxy - 1' - hydroperoxy - biscyclohexylperoxide, dicyclohexyl or tricyclohexyl-hydroperoxide, dihydrofurane-, methyldihydrofurane-, tetrahydrofurane- and tetrahydropyrane-hydroperoxide, as well as the hydroperoxides of α-pinene, β-pinene and menthene-3.

As starting material for the method of the invention, there may also be used hydroperoxides in which the hydroperoxide groups are located on condensed alicyclic rings or on bridge carbon atoms of a condensed alicyclic or alicyclic-aromatic system, for example, the hydroperoxides of tetralin, octahydroanthracene, octahydrophenanthrene and dekalin, which can be obtained by auto-oxidation.

The reaction takes place in accordance with the mechanism:

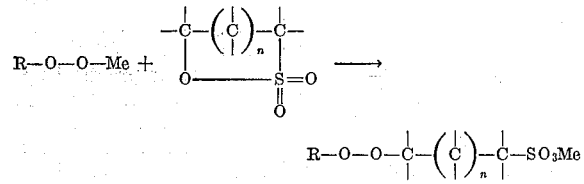

in which R and $n$ have the same meaning as given above and Me is a metal cation, preferably a monovalent or bivalent metal cation. In the case of hydrogen peroxide, 1 mol of hydrogen peroxide can be reacted with 2 sultone molecules and peroxy-disulfonates are obtained.

In order to carry out the reaction, the hydroperoxides are mixed in the form of their salts or in the presence of acid-binding substances, particularly acid-binding alkali or earth alkali compounds, for example, carbonates, hydroxides or oxides of sodium, potassium, magnesium, calcium, strontium or barium, with the sultones. The reaction between hydroperoxides and sultones takes place at times very vehemently; therefore, it is advisable to operate in the presence of solvents. As solvent, water may be used, but higher yields are obtained if the water is replaced in whole or in part by water-soluble organic solvents, such as lower aliphatic alcohols or ketones, i. e., those containing up to 4 carbon atoms, such as methyl, ethyl or propyl alcohols, acetone, methylethylketone, etc. Dioxan, as well as water-soluble lower glycol ethers may also be employed. The organic solvents may be used in their commercial form, possibly mixed together, without prior removal of small quantities of water present therein. The quantity of the solvents to be employed can vary within wide limits and depends, for example, on the violence of the reaction or the solubility of the reaction products. The quantity of solvent can, for example, be as much as 10–20 times the weight of all reactants. If alkali carbonates are used, it is advisable to employ them in anhydrous form.

The reactants and the solvent which is possibly employed may be mixed together in any desired sequence. It is advisable to start with the hydroperoxide and/or sultone, and to add the other reactants, particularly the acid-binding agents, as they are used during the reaction, so that an excess of the acid-binding agent of alkali reaction in the reaction mixture is avoided as far as possible.

Prior to the reaction, there may be added to the hydroperoxide, stabilizers such as magnesium silicates, pyrophosphates, nitrilotriacetic acid, ethylenediaminotetraacetic acid or other aminopolycarboxylic acids, methylcellulose, saccharine, quinoline, dipicolinic acid, hydroxyquinoline, and others.

The course of the reaction differs depending on the reactivity of the starting materials. In certain cases the reaction takes place with a low velocity even at temperatures of about +5° C. and is terminated upon standing for a long time at temperatures of 15–30° C. In other cases it may be necessary to remove the heat of reaction, while in still other cases, the reaction is only brought about by heating to 30–50° C. and is completed by further heating, possibly under reflux or under pressure, to 50–150° C. In most cases, however, it is not necessary to exceed temperatures of 80–100° C.

Since the reaction generally takes place with high yields, it is sufficient to use the reactants, hydroperoxides, sultones, and acid-binding substances, in equivalent quantities. In special cases, for example, when using valuable starting materials which should be converted as completely as possible, one reactant can be used in an excess of up to 50–200% of the theoretical amount.

Working in the absence of any substantial amounts of water facilitates the recovery of the peroxide-group-containing sulfonates which have a greater or lesser solubility in water, depending on the molecular size of the starting materials used but are generally insoluble in organic solvents. Limited quantities of water present in the reaction product may be bound as water of crystallization.

If there there are used hydroperoxides which contain hydroxyl groups, the hydroxyl groups in general will not react under the conditions of the method of the invention.

The peroxide-group-containing sulfonates produced can be isolated from the organic solvent by filtration, possibly by concentration of the solution. The reaction mixture can be concentrated by evaporation, and the desired compounds obtained in the condition of technical purity. The substances can be obtained in pure analytical form by recrystallization.

The sulfonates obtained can be converted by reaction with strong acids into the free sulfonic acids containing peroxide groups and be isolated as such. It has been found particularly advisable to use ion exchangers charged with hydrogen ions for this reaction.

The following examples are given by way of illustration and not limitation:

*Example 1*

16.4 grams (=0.1 mol) tetralinhydroperoxide are dissolved in 10 cc. methyl alcohol and combined with a solution of 12.2 grams (=0.1 mol) propanesultone and 4.0 grams (=0.1 mol) sodium hydroxide in 50 cc. methyl alcohol. After five minutes an exothermal reaction takes place, the temperature being held to 35–40° C. by cooling with ice. After the completion of the reaction, heating is effected for another half hour under reflux, the colorless crystalline paste is suction-filtered after the reaction residue has been cooled in ice, and is thereupon dried in a desiccator. 20.9 grams of colorless crystals are obtained, the quantity of which can be increased to 30.7 grams by evaporating the mother liquor. The sulfonate formed has the formula:

The sulfonate can be recrystallized from methyl alcohol. The crystals contain 1 mol of water of crystallization.

Example 2

As starting material, there is used a mixture of about 70% by weight tertiary butylhydroperoxide prepared from tert. butyl alcohol and hydrogen peroxide and about 30% by weight di-tert. butylperoxide. Into a solution of 23.3 grams of this mixture and 31.6 grams propanesultone in 150 cc. methanol, a solution of 10.4 grams sodium hydroxide in 25 cc. methanol is added drop by drop so slowly that the alkaline reaction occurring upon the introduction of each drop rapidly disappears again.

In order to start the reaction, it is necessary to heat to 40–45° C. After completion of the reaction, which can be noted from the permanent, slightly alkaline reaction of the solution, the addition of the drops of the solution is stopped, the mixture is heated a half hour on a steam bath, and, after cooling in ice, the lustrous flakes are separated by suction-filtration from the mother liquor and the latter is carefully concentrated to recover further reaction product. After drying in a desiccator, 46.7 grams of colorless flakes, having the formula

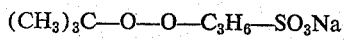

are obtained.

Example 3

To a solution of 23.3 grams of the hydroperoxide mixture used in Example 2 in 150 cc. of methyl alcohol, 37.8 grams of a mixture of butanesultone-1,3 and butanesultone-1,4 (about 2:1) are added, and 10.4 grams of sodium hydroxide dissolved in 25 cc. of methyl alcohol are added drop by drop over the course of 1 hour in accordance with the conditions described in Example 2. Heating under reflux is then effected for a further half hour, whereupon half of the methyl alcohol is distilled off and the balance is cooled with ice. The crystals which are formed in this connection (52.6 grams) are distilled off and dried in a desiccator, and have the formula

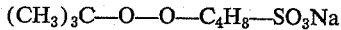

Example 4

To a suspension of 7.8 grams (=0.1 mol) sodium peroxide in 50 cc. methyl alcohol, a solution of 24.4 grams (=0.2 mol) propanesultone in 50 cc. methyl alcohol is added drop by drop at 30–35° C. while stirring. After standing over night and cooling in ice, the product is filtered off with suction and dried in the desiccator. The reaction product is obtained as a colorless powder in a yield of 28.9 grams, and is a mixture of

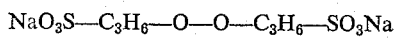
and
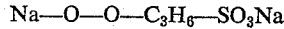

Example 5

To a suspension of 7.8 grams (=0.1 mol) sodium peroxide in 50 cc. ethyl alcohol, 12.2 grams (=0.1 mol) propane sultone dissolved in 50 cc. ethyl alcohol are added drop by drop, while stirring and cooling at 25–30° C. The reaction product which immediately separates out is placed in ice after it has stood for four hours at room temperature, suction-filtered, and dried in a vacuum desiccator. There is obtained a practically colorless, excellently water-soluble powder in a yield of 18.5 grams.

Example 6

36.9 grams (0.2 mol) sodium salt of cumenehydroperoxide are dissolved while hot in 200 cc. of methyl alcohol, and 24.4 grams (0.2 mol) propanesultone are added in separate portions to the filtrated solution while stirring. The heat of reaction produced in this connection is removed by cooling with ice water, so that the temperature of the reaction mixture as far as possible does not exceed 50° C. After the complete addition, stirring is continued for another half hour, followed by cooling with ice, whereupon the crystals formed are removed by suction-filtering, washed with ether, and dried in a desiccator. 56.2 grams of finely crystalline reaction product are obtained, having the formula

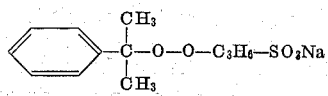

Example 7

8.4 grams n-octylhydroperoxide, prepared in accordance with the method described in the Journal of American Chemical Society, 76, pages 2984–90 (1954) are combined with a solution of 7.0 grams propanesultone in 50 cc. methyl alcohol and a solution of 2.3 grams sodium hydroxide in 25.0 cc. methyl alcohol while stirring at 40–45° C. in such a manner that the pH of the reaction solution does not differ substantially from the neutral point. After standing over night, the colorless needles are removed by suction-filtering, washed with ether, and dried. The yield of crystalline needles having the formula $$C_8H_{17}\text{—}O\text{—}O\text{—}C_3H_6\text{—}SO_3Na$$

is 11.7 grams.

Example 8

4.5 grams (0.05 mol) sec. butyhydroperoxide, prepared in accordance with the method cited in the above example, are dissolved in 25 cc. methyl alcohol, and then combined with 6.2 grams (0.05 mol) propanesultone, whereupon 2.0 grams (0.05 mol) sodium hydroxide in 25 cc. methyl alcohol are slowly added drop by drop at 40–45° C. After cooling colorless crystalline needles separate, the quantity of which can be increased by cooling with ice. After suction-filtering and washing with ether, 9.6 grams of needle-shaped crystals of the formula

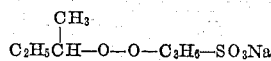

are obtained.

Example 9

To a solution of 18 grams of a mixture of tert. butylhydroperoxide and di-tert.-butylperoxide (about 70:30) and 24.4 grams propanesultone in 50 cc. methyl alcohol, there is slowly added drop by drop, while stirring at 40–50° C. a solution of 31.5 grams Ba(OH)$_2$ in 200 cc. methyl alcohol. After the consumption of about 70% of the methanol Ba(OH)$_2$ solution, the reaction is terminated, as can be noted from the permanent alkaline reaction of the solution, and the reaction product deposits in the form of well-developed crystals. The crystals are removed by suction-filtering, washed with ether, and dried. The yield is 36.5 grams.

Example 10

To 12.2 grams propanesultone dissolved in 50 cc. methyl alcohol, there are added drop by drop over the course of 30 minutes at 45–50° C. 10.0 grams hydrogen peroxide (40%) and a solution of 4.0 grams sodium hydroxide in 50 cc. methyl alcohol, while stirring. Traces of magnesium silicate are added as stabilizer to the hydrogen peroxide.

Stirring is continued for a further half hour, the reaction mixture is cooled with ice, suction-filtered, and washed with ether. 13.8 grams of crystals are obtained.

Example 11

165 grams of a mixture of 40% by weight tert. butylhydroperoxide and 60% by weight di-tert.-butylperoxide (=1.1 mol tert. butylhydroperoxide) and 122 grams (1 mol) propanesultone are dissolved in 100 cc. methyl alcohol at 40° C. A filtered solution of 40 grams (1 mol) sodium hydroxide in 200 cc. methyl alcohol is added drop by drop at 43–45° C. while stirring, so slowly that the alkaline reaction which occurs upon the addition of each drop rapidly disappears again. After the completed addition (about 1 hour) heating is briefly effected at 60° C. and the clear solution is set aside to cool slowly. 207 grams of colorless crystals are obtained. The iodometrically determined peroxide content is 71.7% of the theoretical amount. The substance can be purified by recrystallization from water and has the formula

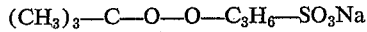

$(CH_3)_3$—C—O—O—$C_3H_6$—$SO_3Na$

*Example 12*

165 grams of the mixture used in Example 11 consisting of tert. butylhydroperoxide and di-tert.-butylperoxide and 136 grams (1 mol) butane sultone-1,4 are dissolved in 200 cc. of methyl alcohol, whereupon a solution of 40 grams (1 mol) sodium hydroxide in 250 cc. methyl alcohol is added drop by drop. The methanol solution contains some α-naphtholphthalene as indicator. The sodium hydroxide solution is added drop by drop so slowly that the indicator only temporarily changes into the alkaline region. The temperature of the reaction mixture is held at 40–41° C. After 1 hour, a further 200 cc. methyl alcohol are added and heated a short time at 60° C. until a clear solution is obtained.

The crystal flakes which deposit upon cooling are removed by suction-filtering, washed with acetone, and dried in a desiccator (208.5 grams).

The peroxide content (iodometric) is 70.2% of the theoretical amount. The substance can be recrystallized from ethyl alcohol or water, and has the formula

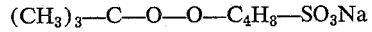

$(CH_3)_3$—C—O—O—$C_4H_8$—$SO_3Na$

*Example 13*

To 240 grams cumenehydroperoxide (70%=168.0 grams cumenehydroperoxide 100%; mg. 152.2) there are simultaneously added drop by drop a solution of 40 grams (1 mol) sodium hydroxide in 250 cc. methyl alcohol and 122 grams (1 mol) propane sultone in 100 cc. methyl alcohol, while stirring over the course of 1 hour at 40–41° C. The methanol solution contains some α-naphtholphthalene as indicator. The sodium hydroxide solution is added drop by drop so slowly that the indicator only temporarily passes into the alkaline region. Thereupon rapid heating to 60° C. is effected in order to obtain a clear solution followed by slow cooling.

After standing over night, the well-developed crystals are removed by suction-filtering, washed twice with a small amount of methyl alcohol and twice with acetone, and dried in a desiccator. By careful concentration of mother liquor by evaporation, there are obtained further crystals. The crude yield is 269.0 grams of material having the formula

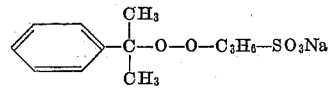

I claim:

1. Process for the preparation of peroxy-sulfonates, which comprises contacting a hydroperoxide salt containing a member selected from the group consisting of alkali and alkaline earth metal cations with a sultone containing 3 to 4 carbon atoms, and recovering the peroxysulfonate formed.

2. Process according to claim 1, in which said hydroperoxide salt is formed in situ by contacting a hydroperoxide with a sultone in the presence of an acid-binding material containing a metal cation.

3. Process according to claim 2, in which hydroperoxide is hydrogen peroxide.

4. Process according to claim 2, in which said hydroperoxide is an organic hydroperoxide containing an organic hydrocarbon radical with 1–30 carbon atoms.

5. Process according to claim 2, in which said contacting is effected in the presence of a water-soluble organic solvent.

6. Process according to claim 1, in which said contacting is effected at a temperature between about 5 and 150° C.

7. Process according to claim 6, in which said contacting is effected at a temperature between about 20 and 80° C.

8. Process according to claim 1, in which said contacting is effected in the additional presence of a hydroperoxide stabilizer.

References Cited in the file of this patent

UNITED STATES PATENTS 2,524,084    Rust et al. _____ Oct. 3, 1950